(12) United States Patent
Koithyar et al.

(10) Patent No.: US 7,962,872 B2
(45) Date of Patent: Jun. 14, 2011

(54) TIMING ANALYSIS WHEN INTEGRATING MULTIPLE CIRCUIT BLOCKS WHILE BALANCING RESOURCE REQUIREMENTS AND ACCURACY

(75) Inventors: Arun Koithyar, Bangalore (IN); Venkatraman Ramakrishnan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 445 days.

(21) Appl. No.: 12/275,246

(22) Filed: Nov. 21, 2008

(65) Prior Publication Data

US 2009/0144674 A1   Jun. 4, 2009

(30) Foreign Application Priority Data

Dec. 4, 2007   (IN) .......................... 2896/CHE/2007

(51) Int. Cl.
*G06F 17/50* (2006.01)
*G06F 9/455* (2006.01)

(52) U.S. Cl. ........ 716/108; 716/100; 716/101; 716/102; 716/103; 716/106; 716/113; 716/126; 716/129; 716/131; 716/134

(58) Field of Classification Search .......... 716/100–103, 716/106, 108, 113, 126, 129–131, 134
See application file for complete search history.

(56) References Cited

U.S. PATENT DOCUMENTS

| | | | |
|---|---|---|---|
| 6,925,621 B2 * | 8/2005 | Mielke et al. | 716/103 |
| 6,928,630 B2 * | 8/2005 | Moon et al. | 716/134 |
| 6,952,816 B2 * | 10/2005 | Gupta et al. | 716/103 |
| 7,188,327 B2 * | 3/2007 | Hahn | 716/108 |
| 7,328,415 B2 * | 2/2008 | Bou-Ghazale et al. | 716/108 |
| 7,350,171 B2 * | 3/2008 | Zhang et al. | 716/108 |
| 7,356,451 B2 * | 4/2008 | Moon et al. | 703/19 |

* cited by examiner

*Primary Examiner* — Nghia M Doan
(74) *Attorney, Agent, or Firm* — John R. Pessetto; W. James Brady; Frederick J. Telecky, Jr.

(57) ABSTRACT

An aspect of the present invention provides for timing analysis when integrating multiple circuit blocks while balancing resource requirements and accuracy. In an embodiment, an optimized model for a circuit block is created by combining information provided by two different models of the same circuit block and performing timing analysis based on the optimized model. In an embodiment, the two models correspond to black box and interface timing models. In the optimized model, ports for which only timing arc information is deemed necessary are modeled using corresponding information from the black box model, while ports for which more accurate or detailed information is deemed necessary are modeled using corresponding information from the interface timing model. The optimized model enables the integration to be performed with a balance of resource requirements and accuracy.

5 Claims, 7 Drawing Sheets

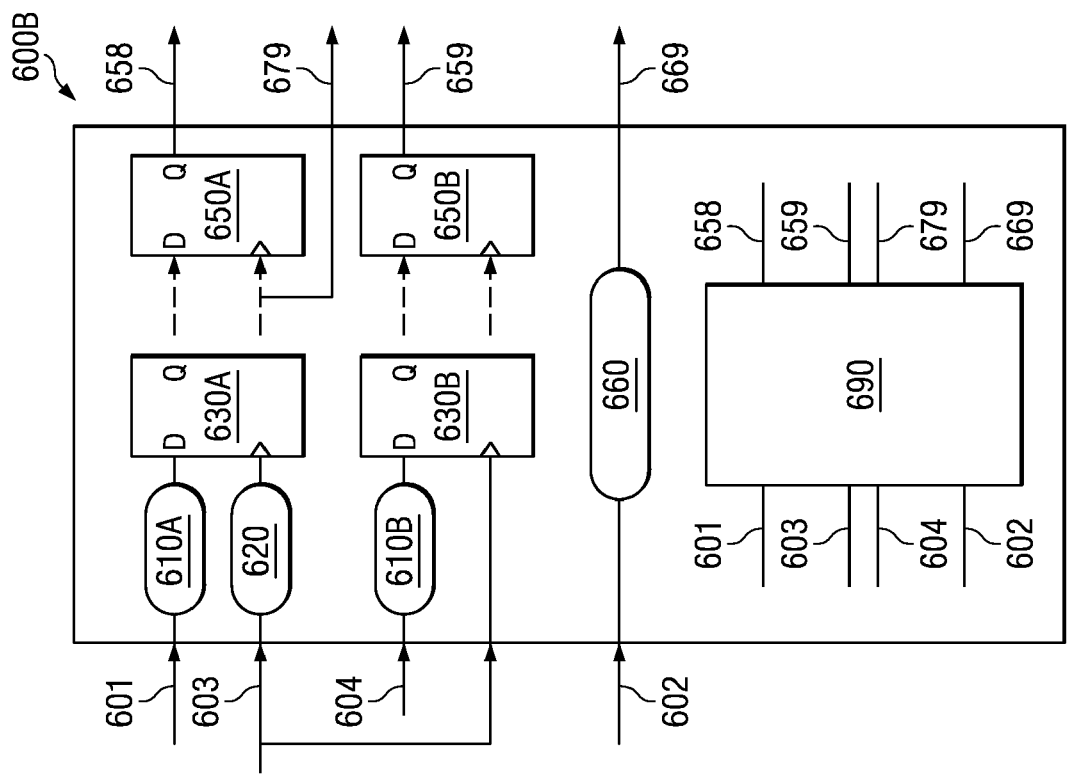
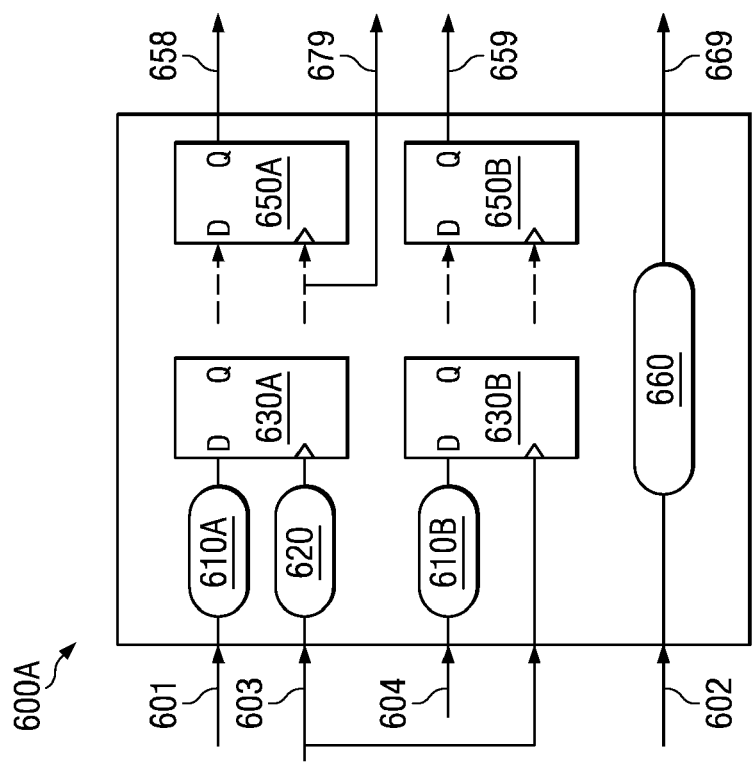

TIMING ANALYSIS WHEN INTEGRATING MULTIPLE CIRCUIT BLOCKS WHILE BALANCING RESOURCE REQUIREMENTS AND ACCURACY

RELATED APPLICATION

The present application claims the benefit of co-pending India provisional application serial number: 2896/CHE/2007, entitled: "ReDBox-A Composite Modeling", filed on Dec. 4, 2007, naming Texas Instruments Inc. (the intended assignee) as the Applicant, and naming the same inventors as in the present application as inventors, attorney docket number: TXN-933, and is incorporated in its entirety herewith.

BACKGROUND OF THE INVENTION

1. Technical Field

The present disclosure relates to integrated circuit (IC) design, and more specifically to timing analysis when integrating multiple circuit blocks while balancing resource requirements and accuracy.

2. Related Art

A circuit of interest (e.g., an Integrated Circuit (IC)) often contains multiple circuit blocks, with each circuit block being designed to provide a corresponding set of features or functionality. The circuits (or ICs, in the examples here) are divided into such circuit blocks, typically for different teams to develop the blocks in parallel, for easier testing, the nature of circuitry within the blocks (e.g., one block processing digital signals and another block processing analog as well as digital signals) etc.

As an illustration, a System-on-a-Chip (SoC) may contain multiple circuit blocks of (often complex) electronics systems. The individual circuit blocks may contain digital, analog, mixed-signal, radio-frequency (RF) functions, etc. Each block may first be designed and tested independently (using personnel and computing resources suited for the specific blocks), and typically in parallel.

Such independently developed circuit blocks are eventually interconnected into a single integrated circuit (chip) during an integration phase. The design (referred to as "top-level") of IC formed by such interconnections is again tested for proper interoperability.

Timing analysis of a physical layout of such interconnected design is one of the requirements in the design phases. Such timing analysis generally checks whether a physical layout corresponding to a circuit design operates within the timing constraints necessitated by factors such as desired operation frequency, manufacturing technology, etc. As is well known, a physical layout represents the structure of individual cells/components in corresponding positions and the interconnecting paths with lengths/material, etc., to correspond to the positions of the components.

Models of circuit blocks are often used in timing analysis. A model of a circuit block (referred to often as a design model) is generally a representation, in the form of corresponding set of data, of a desired set of parameters of the circuit block. Timing analysis (noted above) may be performed consistent with the extent of information stored in the models.

For example, in one approach referred to as a black box model used during integration testing), only the input/output ports/nodes are present, and for each boundary timing arc (between an input port and an output port, between an input port and a clock port, or between an output port and a clock port), corresponding timing information may be maintained. The timing information may include delay, setup and hold timing requirements, etc., for the timing arcs.

In another approach referred to as an unabstracted model, the actual physical layout (complete circuit information) is itself used (for all the cells) as a basis for the timing analysis in the integration testing).

In yet another approach referred to as an interface timing model, peripheral circuitry close to the I/O ports/nodes (for example, leading up to a first clocked element in the signal path, and generally termed boundary information), is included in the model. Thus, an interface timing model may contain a physical and electrical copy of circuitry in the peripheral portions (connected to the ports) of the circuit block, but reduced so that it only includes data that may be required when performing top-level integration and verification.

It may be appreciated that each of the approaches above may have associated benefits and deficiencies. For example, the black box model may be computationally efficient and require only a small memory, but may be less accurate than a desired level due to the limited information provided within the model. On the other extreme, the unabstracted models may require substantially more resources, but be accurate. The interface timing model provides benefits and deficiencies in between the two extremes.

Several features of the present invention provide for a better balance of resource requirements and accuracy.

SUMMARY

An aspect of the present invention provides for timing analysis when integrating multiple circuit blocks while balancing resource requirements and accuracy. In an embodiment, an optimized model for a circuit block is created by combining information provided by two different models of the same circuit block and performing timing analysis based on the optimized model.

In an embodiment, the two models correspond to black box and interface timing models. In the optimized model, ports (e.g., those connected to slower speed interfaces, ports connecting to reset signals, scan based test signals, etc.) for which only timing arc information as deemed necessary for model validation (top-level timing analysis) are modeled using corresponding information from the black box model, while ports (e.g., those connected in time critical paths, those sending clock signals out of the circuit block, etc.) for which more accurate or detailed information is deemed necessary are modeled using corresponding information from the interface timing model.

The optimized model enables the integration to be performed with a balance of resource requirements and accuracy.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

BRIEF DESCRIPTION OF THE DRAWINGS

Example embodiments of the present invention will be described with reference to the accompanying drawings briefly described below.

FIGS. 6A through 6D together illustrate graphically the manner in which an optimized model is created in an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Example Environment

Figure 1A:
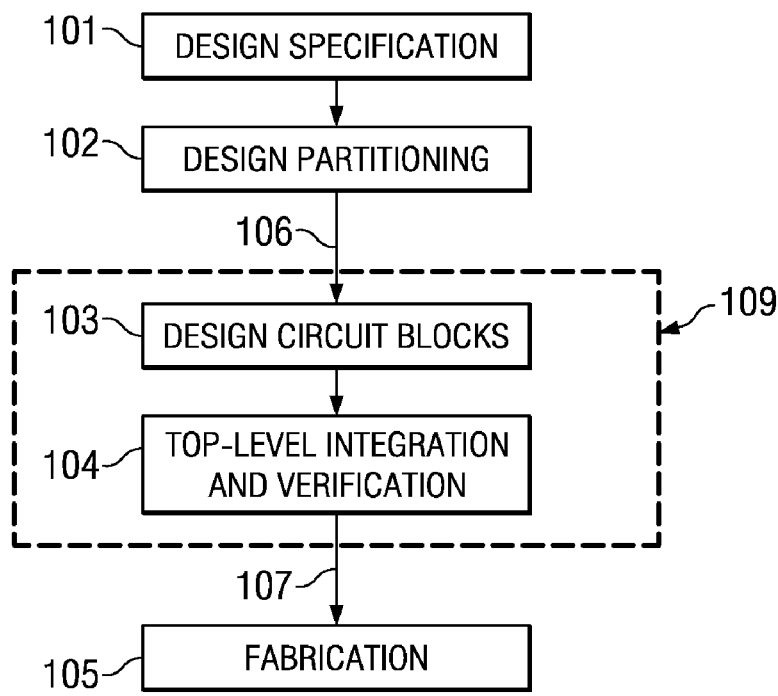
FIG. 1A is a diagram illustrating an example design flow in designing a System on Chip (SoC).

FIG. 1 illustrates an example design flow in designing an SoC in which several features of the present invention can be implemented. The design flow is shown merely by way of illustration, and may include other/alternative phases (steps) as well as sub-phases, and possibly other sequences of phases as well. Although not shown as such, one or more of the phases may be performed in an iterative manner as well. Further, the example flow may be used in general to design and implement any IC.

The design may start with design specifications (101), in which the specifications of the SoC may be established. The overall design specification (101) may be split into smaller circuit blocks in a design partitioning phase (102). The detailed functional requirements of each circuit block (also known as module) may be provided (as denoted by path 106) to a design phase (design circuit blocks 103).

In design circuit blocks (103), functional description (for example using a hardware programming language such as VHDL, Verilog etc) of each of the circuit blocks may be performed, followed by synthesis of the descriptions into corresponding circuit implementations (e.g., in terms of logic blocks, memory etc). Functional description and synthesis performed in design circuit blocks (103) may generate for each circuit block a netlist (specifying interconnections between the various components/blocks), as well as a library of the components contained in each of the circuit blocks.

Based on the output of design circuit blocks phase (103), design model(s) may be generated for one or more circuit blocks. The design model of a circuit block may be used by designers of other blocks (or alternatively, during an integration phase, in which each of the circuit blocks are interconnected) to test functionality and/or timing requirements between the circuit block and the other blocks, without having to use a complete description of the circuit block.

Figure 1B:
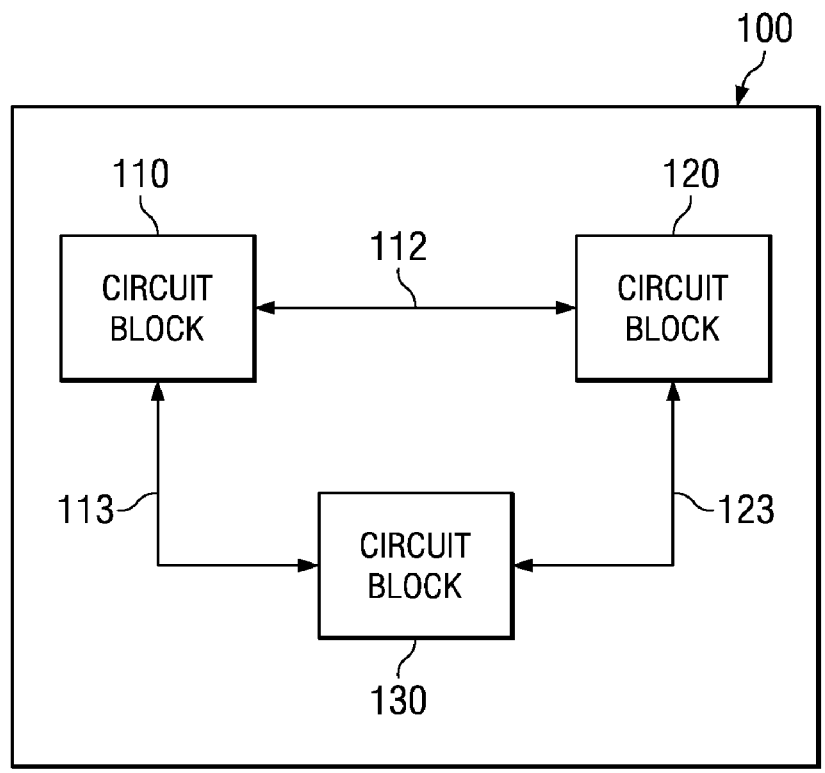
FIG. 1B is a diagram illustrating a top-level view (circuit blocks and interconnections) of a SoC in an embodiment.

To illustrate with respect to FIG. 1B, SoC 100 may be design-partitioned to contain three circuit blocks (modules) 110, 120 and 130, having corresponding interconnections (signals, data, clocks etc.) 112, 13 and 123, as shown in the Figure. Each of the blocks 110, 120 and 130 may be designed separately, and models representing each of the blocks may be generated. As an example, circuit block 130 may correspond to a central processing unit (CPU), circuit block 110 may correspond to a memory controller, and circuit block 120 may correspond to a peripheral controller, etc.

Combined functionality of all three blocks may be verified (corresponding to phase 104 of FIG. 1A) using corresponding design models of circuit blocks 110, 120, and 130. In other instances, complete description (containing the specific implementation details) of one of the blocks may be used along with design models of some of the other blocks. For example, assuming circuit block 130 is a Central Processing Unit (CPU), a partial or complete design of the CPU may be verified using a design model of circuit block 110, to ensure that functionality and timing requirements of the connections between the two blocks are satisfied.

Thus, while designing CPU (circuit block 130), a designer may, at various instances in time (various stages of the design of the CPU), use the design model corresponding to circuit block 110, for testing and verification.

Figures 1C, 3:
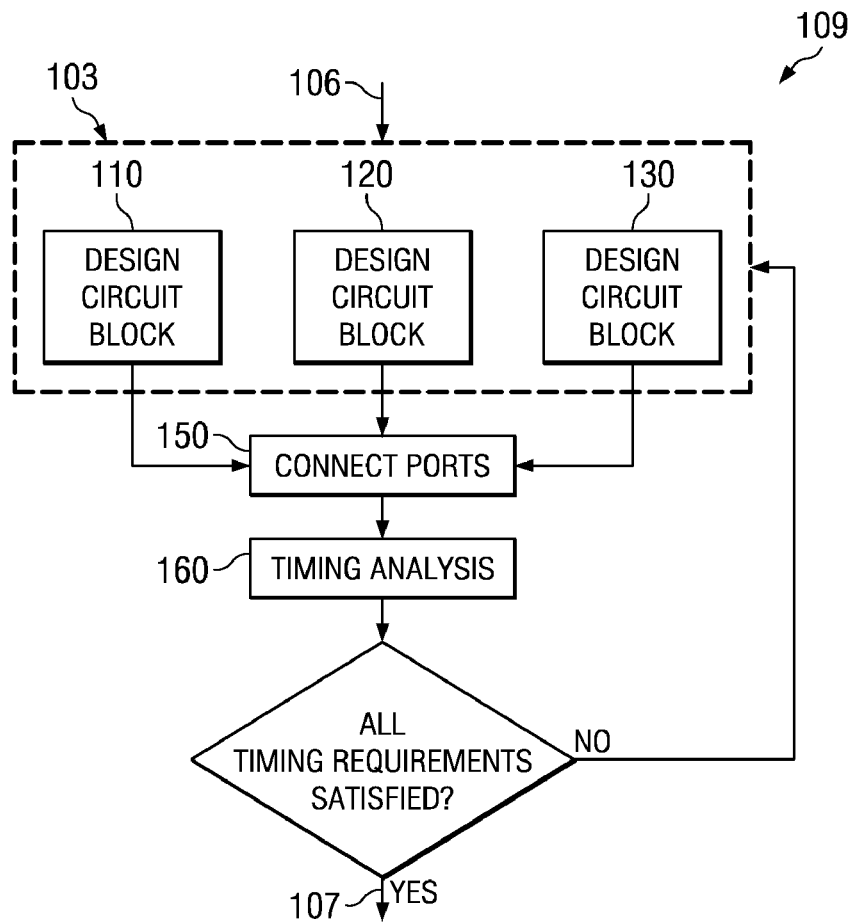
FIG. 1C is a diagram illustrating the operations involved in integrating multiple circuit blocks of a SoC in an embodiment.
FIG. 3 is a table illustrating the information maintained in a black box timing model of a portion of an example circuit block of a SoC.

FIG. 1C illustrates in greater detail, phases 103 and 104 (in combination referred to as phase 109) of FIG. 1A. Design phase 103 is shown as containing individual design phases, one each for each of the circuit blocks 110, 120 and 130 of FIG. 1B. Models for each of the circuit blocks may also be generated in phase 103. The models may be based on a completed design or at an earlier time, for example, when the design is partially ready or even before beginning of the design (in which case the model may be generated directly based on the design requirements obtained in phase 101 or 102 of FIG. 1A).

Ports of the individual circuit blocks may then be connected (phase 150), and a timing analysis may then be performed (timing analysis 160). If required or desired timing requirements are satisfied, the "top-level" verified and integrated SoC design may be sent for fabrication.

As is well known in the relevant arts, several types of design models of circuit blocks are available. As noted above, such models include "black-box" models to "unabstracted" models. In black-box models the implementation details (circuit details, component interconnections, layout, etc) of (within) the block may be absent, and only placement information of the external nodes (or ports), description of the signals on the ports, and timing information of boundary timing arcs (also referred to below simply as timing arcs) of the signals at the ports are present.

Unabstracted models, on the other hand may provide complete circuit information of the circuit block. Example models that may be used in the corresponding design phases noted above are illustrated next with respect to an example.

2. Example Circuit Block and Design Model

FIG. 2A is a diagram illustrating partially, the details of an example implementation of circuit block 110. Circuit block 110 is shown containing ports 201 (IN1), 202 (IN2), 203 (CLK), 259 (OUT1), 269 (OUT2), combinational logic blocks 210, 220, 240 and 260, and flip-flops (registers) 230 and 250. Circuit block 110 shown in FIG. 2A is provided merely by way of illustration, and may contain more number and types of components (cells) as well as ports.

Ports 201 (IN1) and 202 (IN2) are designed to receive data from an external circuit block or other devices/chips (together referred to as external blocks). Ports 259 (OUT1) and 269 (OUT2) are designed to provide data to external blocks. Port 203 (CLK) is designed to receive a clock signal from external blocks.

Signal on port 201 is provided to combinational logic block 210, whose output in turn is provided as the data (213) input to flip-flop 230. A clock signal received on port 203 is provided to combinational logic block 220, whose output in turn is provided as the clock (223) input to flip-flop 230. Output 234 of flip-flop 230 is shown as being provided to combinational logic block 240, whose output 241 may be provided to other circuit portions not shown. Flip-flop 250 receives a data input on path 251, and provides a data output on port OUT1 (259) in response to a clock edge received on path 223. Combinational logic block 260 receives a data signal via port 202 (IN2), as well as internal signals 261 and 262, and provides an output on port 269 (OUT2).

A timing path associated with a pair of ports (e.g., 201 aid 203, 259 and 203, 202 and 269) is often referred to as a timing arc, and corresponding timing requirements or timing information may be provided for all timing arcs in circuit block 110. For example, with respect to timing arc 201/203, setup and hold time requirements may be specified. With respect to timing arc 202/269, a delay from input 202 to output 269 may be specified. With respect to timing arc 259/203, a delay in output 259 from a clock edge of clock 203 may be specified. Such information may be created in the form of a timing model for circuit block 110.

When timing analysis (160) is to be performed (for example after interconnection of signals between circuit block 130 and circuit block 110), a designer of block 130 may use a timing model of circuit block 110, rather than a complete representation (unabstracted) of circuit block 110 itself.

Figure 2:
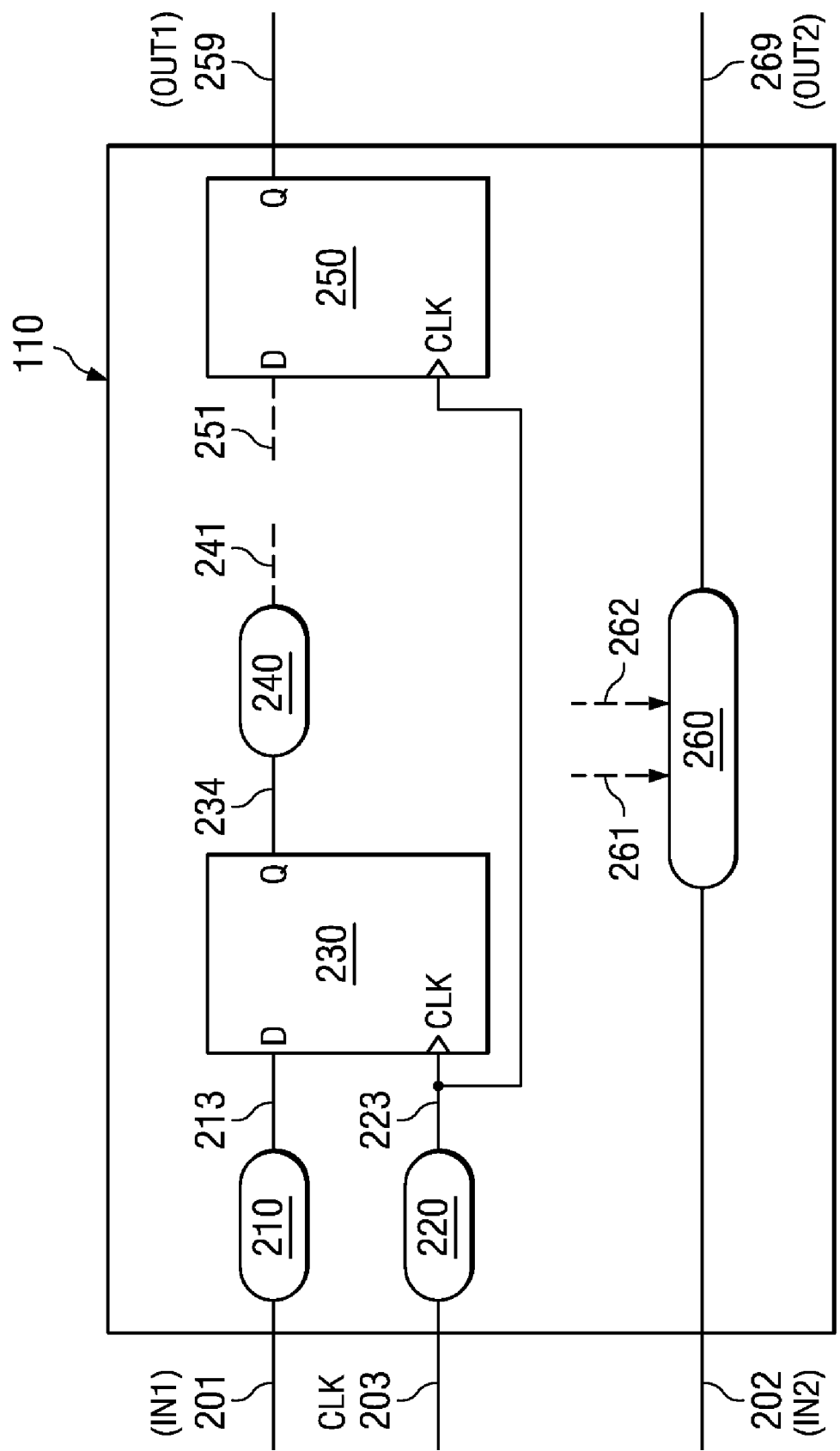
FIG. 2 is a diagram illustrating a portion of an example circuit block of a SoC.

FIG. 3 shows a table representing an example "black box" timing model of the portion of circuit block 110 illustrated in FIG. 2. Black box model 300 is shown containing timing arc information associated with the ports of circuit block 110. Columns C1 and C2 contain the respective ports associated with the timing arc, with column C3 containing the corresponding timing parameter.

Row R1 is shown containing the entries corresponding to ports 202 and 269, with signal delay from port 202 to 269 being specified as 5 nanoseconds (ns). Row R2 is shown containing the entries corresponding to ports 201 and 203, with setup time being specified as 2 ns, and hold time specified as 1 ns. Row R3 is shown containing the entries corresponding to ports 259 and 203, with a delay from an active edge of port 203 to a valid signal at port 259 being specified as 1 ns.

Thus, a black box model of circuit block 110 contains timing information of timing arcs at ports of said circuit block, and may not contain detailed description/representation of internal circuitry, etc. Model 300 is shown merely by way of illustration, and various other formats or types of data structures may be used to store the model. Some example black box models provided by commercial EDA (Electronic Design Automation) vendors are .LIB (Synopsys Liberty Format) model provided by Synopsys, and also supported by other EDA vendors.

An interface timing model of circuit block 110 may contain at least some portions of circuitry connected to ports of circuit block 110. To illustrate an example with respect to FIG. 2, an interface timing model may contain the circuit structure (components and interconnections, including physical layout information) of portions 210, 220, 230, 250 and 260.

However, the interface timing model may not contain information about other components/cells that are internal to circuit block 110 in terms of not being relevant for a top-level integration. For example, the interface timing model may not contain any information about combinational logic block 240. The information in the interface timing model may be stored in any of several formats. An example interface timing model is the ILM (Interface Logic Model) provided by Synopsis.

An unabstracted model, as noted above, contains the complete circuit description and actual physical layout of circuit block 110, and may be the same as the (complete) design content of circuit block 110 itself.

From the description above, it may be appreciated that a timing analysis using any one of the model types noted above may have corresponding benefits and deficiencies. Unabstracted and interface timing models may have the advantage of containing more information about the modeled circuit block than a black box model. Timing information extracted from unabstracted and interface timing models may be more accurate than that contained in a black box model, since the timing may be extracted specific to any desired manufacturing process corner.

Timing information contained in a black box model is often fixed, and it may not be possible to obtain corresponding numbers for multiple process corners. Further, interface timing and unabstracted models may enable derating of the timing parameters to be performed to account for on chip variations (voltage, temperature variations, etc., while a black box model may not offer such a facility.

On the other hand, interface timing models and unabstracted models may require a larger memory for storage when compared to a corresponding black box model. Further, interface timing models and unabstracted models may not explicitly contain timing information (for the various timing arcs), and such information may have to be generated (extracted), thereby requiring more time to perform the timing analysis. Black box models, on the other hand, explicitly contain timing information.

Unabstracted models and interface timing models may be associated with various other deficiencies, such as presence of redundant data (which translates to larger storage requirements). For example, some signals (e.g., some test signals) may be viewed as being redundant for the purpose of performing timing analysis for circuit block 130 and circuit block 110.

While black box models may be efficient in terms of reduced storage requirements and reduced execution time (run-time), such models may not be suitable for timing analysis in some scenarios. For example, in analyzing timing for timing path between two circuit blocks (such as circuit block 130 and 110 in the example noted above), a designer may often need to know the manner in which circuit portions associated with the timing paths are implemented. A black box does not provide such a facility.

Thus, at least when performing timing analysis for a combination of circuit blocks (such as during an integration phase of a design), it may be desirable to operate with design models that provide a good balance of resource requirements and accuracy, as well as other desirable but often conflicting requirements. Several aspects of the present invention provide such a model, as described next with examples.

3. Model

Figure 4:
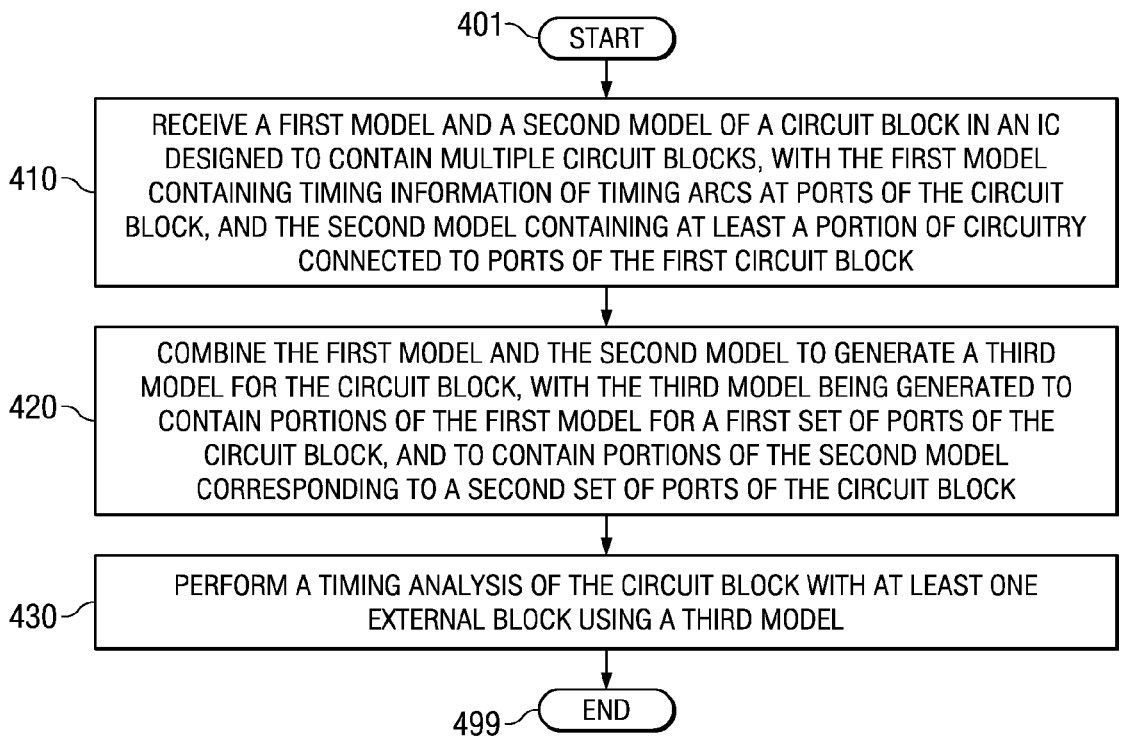
FIG. 4 is a flowchart illustrating the manner in which design models of a circuit block are combined according to an aspect of the present invention.

FIG. 4 is a flowchart illustrating the manner in which an improved model of a circuit block is created and used to perform a timing analysis, according to an aspect of the present invention. The flowchart is described with respect to FIG. 1C, merely for illustration. However, various features can be implemented in other environments and other components. Furthermore, the steps are described in a specific sequence merely for illustration.

Alternative embodiments in other environments, and using a different sequence of steps, can also be implemented without departing from the scope and spirit of several aspects of the present invention, as will be apparent to one skilled in the relevant arts by reading the disclosure provided herein. The flowchart starts in step 401, in which control passes immediately to step 410.

In step 410, a first model and a second model of a circuit block in an IC designed to contain multiple circuit blocks is received. In the illustrative example herein, the two models correspond to black box and interface timing models, respectively. Thus, the first model contains timing information of timing arcs at ports of the circuit block, while the second model contains at least a portion of circuitry connected to ports of the circuit block. Control then passes to step 420.

In step 420, the first model and the second model are processed to generate a third model for the circuit block, with the third model being generated to contain portions of the first model for a first set of ports of the circuit block, and to contain portions of the second model corresponding to a second set of ports of the circuit block. Which model (first or second) is to be used corresponding to which of the ports (first set or second set) may be based on various considerations, some examples of which are provided in sections below. Control then passes to step 430.

In step 430, a timing analysis of the circuit block with at least one external block using the third model is performed. Control then passes to step 499, in which the flowchart ends.

Thus, timing analysis may be performed with a single (optimized) model that balances accuracy and storage size requirements. The manner in which an optimized model is generated in an embodiment of the present inventions is described next.

4. Implementation

Figure 5:
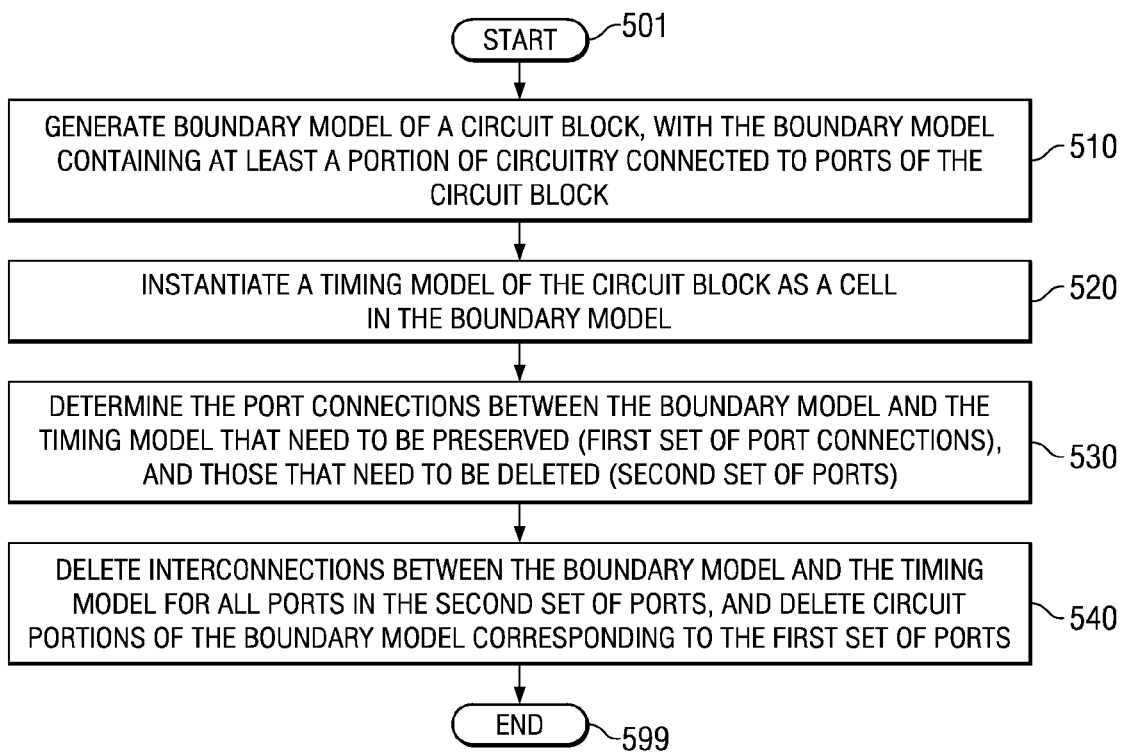
FIG. 5 is a flowchart illustrating the implementation techniques used to generate an optimized model of a circuit block in an embodiment of the present invention.

FIG. 5 is a flowchart illustrating the manner in which an optimized model of a circuit block is created in an embodiment of the present invention. The flowchart is provided merely by way of illustration, and other techniques, steps, and/or sequence of steps can also be implemented to create the optimized model without departing from the scope and spirit of several aspects of the present invention, as will be apparent to one skilled in the relevant arts on reading the disclosure herein. The flowchart starts in step 501, in which control passes immediately to step 510.

In step 510, a boundary (interface timing) model of the circuit block is generated. Control then passes to step 520. In step 520, a timing (black box) model of the circuit block is placed (instantiated) as a cell in the boundary model. Instantiation of the black box model as a cell automatically connects the ports in the black box model and the corresponding port (with same port identifier) in the boundary model. It is noted that both the boundary model and the black box cell contain identical ports, as they are derived (generated from) from the same circuit block. Control then passes to step 530.

In step 530, a determination of the port connections between the boundary model and the timing model that need to be preserved (first set of port connections), and those that need to be deleted (second set of ports) is made. Such determination may be based on various considerations, such as which port will carry (receive or send) timing critical signals (timing critical as viewed from a perspective of the overall top-level integrated SoC/IC), which ports carry signals contained in slower interface paths, etc, as described further in detail below. It may be noted that such a determination effectively specifies the type of model to be used (whether boundary/second or timing/first models) for each port of the circuit block. Control then passes to step 540.

In step 540, based on the determination made in step 530, interconnections between the boundary model and the timing model for all ports in the second set of ports are deleted. The interconnections between the boundary model and the timing model for all ports in the first set of ports are retained. The circuit portions of the boundary model corresponding to (connected to) the first set of ports is also deleted. A processed model is thus obtained.

In addition, circuit portions associated with critical timing paths not (originally) contained in the boundary model, are added (imported) to the processed model. For example, inter-clock paths (data paths between two registers clocked by clocks of different phases or frequencies) may be added from a circuit description (such as an unabstracted model) of the circuit block, to the processed model to provide a final processed model (third model). Control then passes to step 599, in which the flowchart ends.

Thus, the operations noted above, provide a third model containing timing information associated with timing arcs for the first set of ports (for which only such timing information is deemed necessary), and contains at least a portion of circuitry connected to the second set of ports (boundary information for the second set of ports). In addition, information for critical paths such as inter-clock paths (provided neither by the first nor the second models) is contained in the third model.

The third model thus created may require a smaller memory than an interface timing or boundary mode (due to deletion of portions of the boundary model corresponding to the first set of ports), but still provide good accuracy for timing analysis for ports in the second set due to retention of boundary information for such ports. The third model may thus provide a good balance of resource requirements and accuracy. Operations corresponding to step 510 may be performed using an EDA design tool. Operations corresponding to steps 520, 530 and 540 may be performed by software, hardware, or a combination of software and hardware according to aspects of the present invention.

In an embodiment of the present invention, the determination of which ports are to contain only timing arc information, and which ports need boundary information is made according to one or more of the guidelines provided in sections below. It must be understood that the guidelines provided below may vary based on the specific nature of the overall design (SoC or IC), and the manner in which each of the circuit blocks is designed, and are therefore neither exhaustive nor fixed, but are provided merely by way of illustration. Several other criteria for such determination will be apparent to one skilled in the relevant arts by reading the disclosure contained herein.

In general, ports carrying signals of slow interfaces, scan test logic, reset logic are determined as requiring to be included in the first set of ports (and thereby requiring only timing arc information provided by the first model, for example, a timing model).

On the other hand, ports associated with (connected to) circuits that are deemed to be fast and timing critical, ports carrying generated clocks (generated clock-out ports) and feed-through clock paths, constrained nodes and side loads for retained paths are determined as requiring inclusion in the second set of ports (thereby requiring boundary information provided by the second model, for example, a boundary or interface timing model). Boundary registers associated with inter-clock paths are added (imported).

A clock feed-through path (e.g., port 679 in FIGS. 6A-6D) generally refers to a clock path provided as an output of a circuit block (for e.g., a buffered input clock, provided as an output for feeding other circuit blocks in an SOC). A clock feed-through path need not necessarily be a direct connection between an input clock port and an output clock port, and can have logic elements (buffers or other logic gates, as noted above) between the input clock and output clock ports.

Constrained nodes are portions of a circuit block on which timing constraints may be defined for a timing analysis. Sideloads refer to loads connected to logic gates or connecting paths that get removed during creation of an interface timing model. Even if one or more of the loads gets removed, the loading (interconnection parasitics) provided by the removed loads may still be needed to be accounted for (for accuracy) when performing timing analysis. Hence, the removed loads are modeled by a "side-load" equal to their respective input capacitances.

In an embodiment, a designer determines which ports are to be included in the first set and which ports are to be included in the second set. The designer then provides such information in the form of a file. Alternatively, such determination can be automated, using timing slack thresholds, fanouts etc., to decide on whether to include the related port information in the second set (retention of logic) or the first set (using timing arcs/black-box).

5. Example Illustration

FIGS. 6A through 6D are diagrams illustrating graphically the implementation techniques illustrated with respect to the flowchart of FIG. 5, and based on some of the guidelines noted above. For ease of description the following description is provided with the models being represented in diagrammatic form. However, it may be noted that such models are typically contained in the form of corresponding data structures (in the form of sets of data, generally), which may be stored as corresponding files in a computer system or storage medium.

FIG. 6A shows an example boundary model of a circuit block. Model 600A is shown containing ports 601, 602, 603, 604, 658, 659, 669 and 679. Ports 601, 602 and 604 are shown as being input data ports, while ports 658, 659 and 669 are shown as being output data ports. Port 603 is an input clock port, and port 679 is a clock-out port. 610A, 610B, 620 and 660 represent combinational logic blocks. Data inputs and clocks (including clock 679) to registers 650A and 650B are generated internally in the circuit block, and the sources of these signals are not shown. The data inputs to 650A and 650B may not be contained in model 600A as well. Clock 679 is also provided as a clock-out port. Although clock 679 is shown as being provided to register 650A, as well as being a clock-out port, register 650A may instead also be provided with a different clock not connected to clock 679. The generation of model 600A corresponds to step 510 of FIG. 5.

Figure 6C:
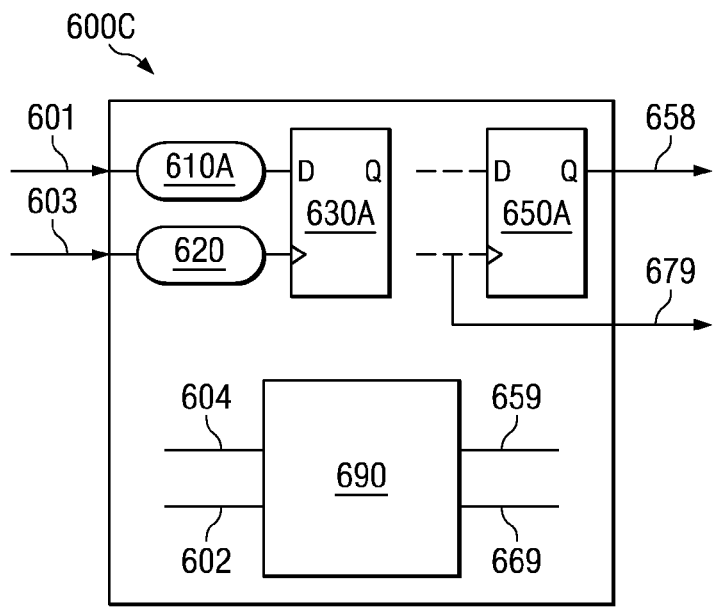

A timing model 690 of the circuit block is then instantiated in boundary model 600A, to provide intermediate model 600B, as shown in FIG. 6B. As noted above, instantiation of timing model 690 within model 600A results in the ports being automatically connected (since they are like-named ports of the same circuit block, but not shown as such in the FIGS. 6B-6D). The instantiation of model 690 within model 600A to provide intermediate model 600B corresponds to step 520 of FIG. 5.

It may be determined based on various considerations (including those noted above), that information of ports 604, 659, 602 and 669 need be represented only in the form of timing information contained in timing model 690, while information of ports 601, 603, 658 and 679 (679 being a clock-out port) needs to be represented using the corresponding boundary information contained in the boundary model (interface timing model).

Accordingly, interconnections between the like-named ports 604, 659, 602 and 669 in model 690 and model 600A are retained. The corresponding circuit components and interconnections (boundary information) associated with the ports 604, 659, 602 and 669 are deleted. The boundary information associated with ports 601, 603, 658 and 679 is retained. The resulting intermediate model 600C is shown in FIG. 6C, and the generation of intermediate model 600C corresponds to steps 530 and 540 of FIG. 5. Assuming there are no inter-clock paths contained in the circuit block, model 600C would represent the final processed (third) model, to be used for timing analysis.

Figure 6D:
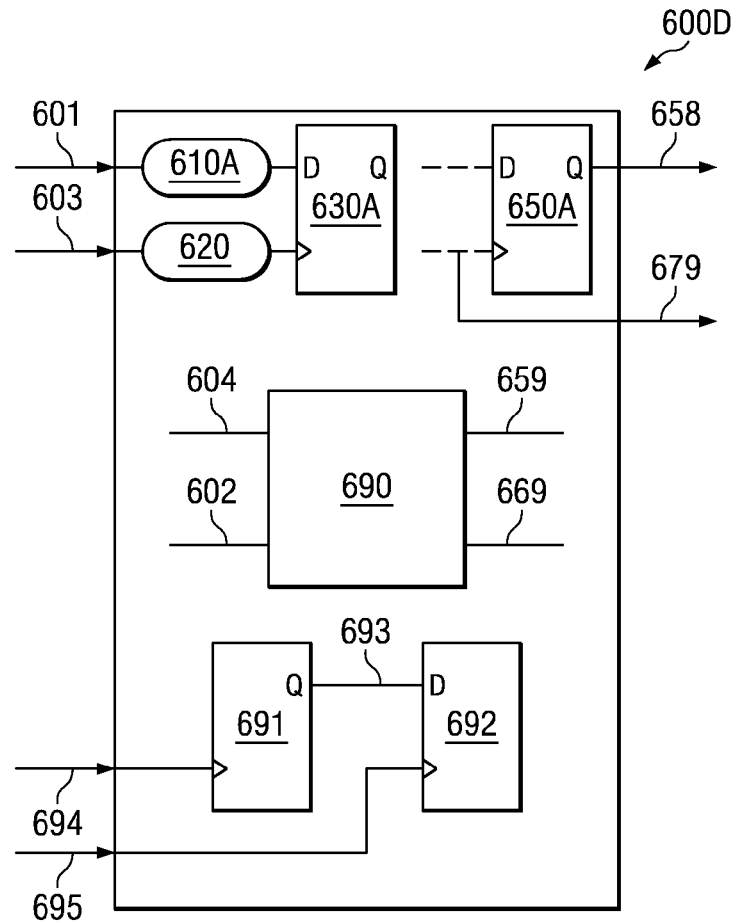

Assuming an inter-clock path (data path between registers clocked by clocks of different phase or frequency) is present in the circuit block, the corresponding registers 691 and 692 related to an inter-clock path (693 between data output of register 691 and data input of register 692, of FIG. 6D) are imported from the design description (e.g., unabstracted model) of the circuit block (and retained as circuit component and interconnections) in model 600D. The path delay on path 693 may be computed (e.g., during timing extraction). The resulting processed model 600D then represents the third model to be used for analysis.

Several features of the present invention may be implemented using software, hardware, or a combination of hardware and software. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by employing a mix of hardware, software and/or firmware.

In an embodiment of the present invention, the operations described with respect to flowcharts 4 and 5 are implemented as software instructions written using PERL script. In the embodiment, a corresponding software block (as may be implemented in a system described below) reads and parses (data structures contained within) a boundary model of a circuit block, instantiates a timing box model of the circuit block, and performs the deletions, additions etc, as noted above. Accordingly, an example embodiment implemented substantially in software is described next.

5. Digital Processing System

Figure 7:
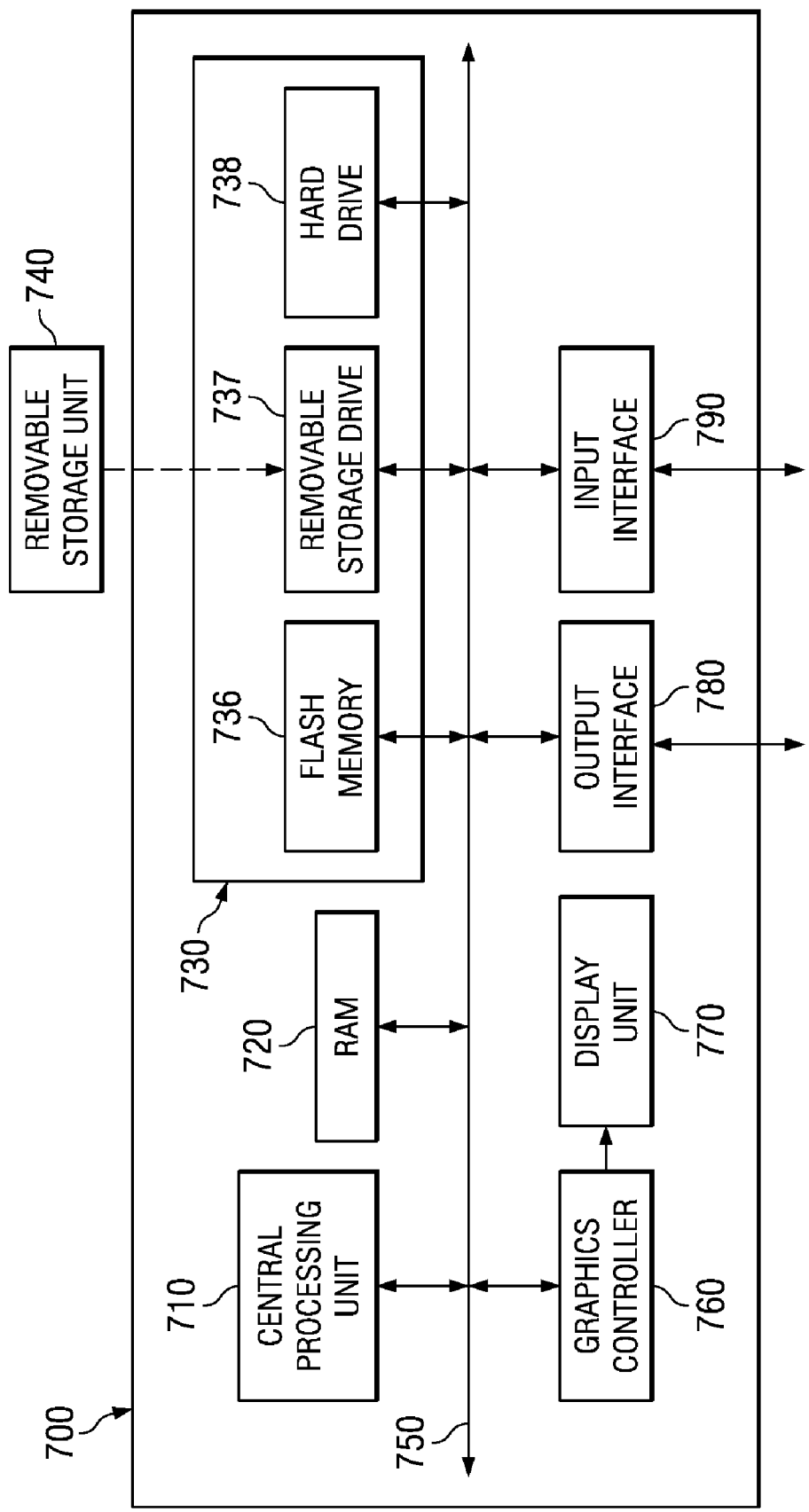
FIG. 7 is a block diagram illustrating the details of a system in which several aspects of the present invention are operative by execution of appropriate software instructions.

FIG. 7 is a block diagram illustrating the details of digital processing system 700 in which several aspects of the present invention are operative by execution of appropriate software instructions. Digital processing system 700 may be used to implement various phases of operations of the flowcharts of FIG. 4 and FIG. 5, as well as other operations that may be required associated with the operations therein, and as described above.

Digital processing system 700 may contain one or more processors such as a central processing unit (CPU) 710, random access memory (RAM) 720, secondary memory 730, graphics controller 760, display unit 770, output interface 780 and input interface 790. All the components may communicate with each other over communication path 750, which may contain several buses as is well known in the relevant arts.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit. RAM 720 may receive instructions from secondary memory 730 using communication path 750.

Input interface 790 may correspond to a keyboard and a pointing device (e.g., touch-pad, mouse) and may be used to provide. Output interface 780 provides connectivity to devices external to system 700, and may be used to communicate with other connected systems (not shown). Output interface 780 may include a network interface.

Secondary memory 730 may contain hard drive 735, flash memory 736, and removable storage drive 737. Secondary memory 730 may store the data (e.g., design information of a circuit block, and its boundary and timing models, various input/output data associated with the generation of a "third" model as noted above, etc,) and software instructions, which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, or removable, etc.).

In this document, the term "computer program product" is used to generally refer to removable storage unit 740 or hard disk installed in hard drive 738. These computer program products are means for providing software to digital processing system 700. CPU 710 may retrieve the software instructions, and execute the instructions to provide various features of the present invention described above.

It should be understood that numerous specific details, relationships, and methods are set forth to provide a full understanding of the invention. Various operations related to implementation of the features described above may be performed by one or more modules/blocks using hardware circuits containing custom very large scale integration circuits or gate arrays, off-the-shelf semiconductors such as logic chips, transistors or other discrete components. A module/block may also be implemented in programmable hardware devices such as field programmable gate arrays, programmable array logic, programmable logic devices, or the like.

Modules/blocks may be implemented in software for execution by various types of processors. An identified module of executable code may, for instance, contain one or more physical or logical blocks of computer instructions which may, for instance, be organized as an object, procedure, or function. Nevertheless, the executables of an identified module need not be physically located together, but may contain disparate instructions stored in different locations which when joined logically together constitute the module/block and achieve the stated purpose for the module/block.

It may be appreciated that a module/block of executable code could be a single instruction, or many instructions and may even be distributed over several code segments, among different programs, and across several memory devices. Further, the functionality described with reference to a single module/block can be split across multiple modules/blocks or alternatively the functionality described with respect to multiple modules/blocks can be combined into a single (or other combination of blocks) as will be apparent to a skilled practitioner based on the disclosure provided herein.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A non-transitory computer readable medium storing one or more sequences of instructions causing a digital processing system to facilitate designing of an integrated circuit containing a plurality of circuit blocks, wherein execution of said one or more sequences of instructions by one or more processors contained in said digital processing system causes said digital processing system to perform the actions of:

receiving a corresponding model for each of said plurality of circuit blocks, wherein the model for a first circuit block contains timing information of timing arcs for a first set of ports of said first circuit block, and at least a portion of peripheral circuitry connected to a second set of ports of said first circuit block; and performing timing analysis of said first circuit block with at least one external block using said model of said first circuit block, said one external block and said first circuit block being contained in said plurality of circuit blocks;

forming the model of said first circuit block by combining a first model and a second model of said first circuit block;

wherein said first model is according to a black box model such that said first model contains timing information of timing arcs at ports of said circuit block, and wherein said second model is according to an interface timing model such that said second model contains at least a portion of circuitry connected to ports of said first circuit block, said forming further comprising:

selecting said first set of ports from said first model, and said second set of ports from said second model, wherein the model for said first circuit block comprises said first set of ports with information corresponding to said first model and said second set of ports with information corresponding to said second model;

wherein said combining comprises:

instantiating said first model in said second model;

deleting connections, formed by said instantiating, between ports of said first model and said second model that are determined to be said second set of ports, while retaining connections, formed by said instantiating, between ports of said first model and said second model that are determined to be said first set of ports; and deleting circuit portions of said second model corresponding to said first set of ports.

2. The non-transitory computer readable medium of claim 1, wherein determination of said first set of ports and said second set of ports comprises identifying a first port on which a clock signal is being sent out of said first circuit block, and including said first port in said second set of ports.

3. The non-transitory computer readable medium of claim 1, wherein determination of said first set of ports and said second set of ports comprises identifying a second port on which time critical signals are being received or sent, and including said second port in said second set of ports.

4. The non-transitory computer readable medium of claim 1, wherein determination of said first set of ports and said second set of ports comprises:

identifying a third port which is coupled to one of a test signal, and a slower interface, and including said third port in said first set of ports.

5. A system for facilitating designing of an integrated circuit containing a plurality of circuit blocks, said system comprising:

a processor and a memory, wherein said processor is operable to:

receive a corresponding model for each of said plurality of circuit blocks, wherein the model for a first circuit block contains timing information of timing arcs for a first set of ports of said first circuit block, and at least a portion of peripheral circuitry connected to a second set of ports of said first circuit block; and perform timing analysis of said first circuit block with at least one external block using said model of said first circuit block, said one external block and said first circuit block being contained in said plurality of circuit blocks;

wherein said processor is further operable to:

form the model of said first circuit block by combining a first model and a second model of said first circuit block;

wherein said first model is according to a black box model such that said first model contains timing information of timing arcs at ports of said circuit block, and wherein said second model is according to an interface timing model such that said second model contains at least a portion of circuitry connected to ports of said first circuit block, said processor being further operable to:

select said first set of ports from said first model, and said second set of ports from said second model, wherein the model for said first circuit block comprises said first set of ports with information corresponding to said first model and said second set of ports with information corresponding to said second model;

wherein said combining comprises:

instantiating said first model in said second model;

deleting connections, formed by said instantiating, between ports of said first model and said second model that are determined to be said second set of ports, while retaining connections, formed by said instantiating, between ports of said first model and said second model that are determined to be said first set of ports; and deleting circuit portions of said second model corresponding to said first set of ports.

\* \* \* \* \*